United States Patent [19]
Ohtani

[11] Patent Number: 5,930,409
[45] Date of Patent: *Jul. 27, 1999

[54] IMAGE PROCESSING APPARATUS FOR PROCESSING CODE INFORMATION READABLE BY MACHINE

[75] Inventor: Kazuo Ohtani, Kodaira, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/575,140

[22] Filed: Dec. 19, 1995

[30] Foreign Application Priority Data

Dec. 20, 1994 [JP] Japan ................................. 6-334787

[51] Int. Cl.⁶ ........................................................ G06K 9/03
[52] U.S. Cl. ................................... 382/311; 382/309
[58] Field of Search .................................. 382/181, 183, 382/309, 310, 311; 395/767, 185.05; 235/462

[56] References Cited

U.S. PATENT DOCUMENTS

| | | | |
|---|---|---|---|
| 4,948,955 | 8/1990 | Lee et al. ................................. | 235/462 |
| 5,120,940 | 6/1992 | Willsie ................................... | 235/462 |
| 5,227,616 | 7/1993 | Lee ........................................ | 235/462 |
| 5,274,468 | 12/1993 | Ojha ...................................... | 382/309 |
| 5,278,398 | 1/1994 | Pavlidis et al. ....................... | 235/462 |
| 5,521,368 | 5/1996 | Adachi ................................. | 235/462 |
| 5,619,708 | 4/1997 | Ho ........................................ | 395/767 |

FOREIGN PATENT DOCUMENTS 2-14368  1/1990  Japan .

*Primary Examiner*—Bipin H. Shalwala
*Attorney, Agent, or Firm*—Fitzpatrick, Cella, Harper & Scinto

[57] ABSTRACT

A bar code written on a original is read by a bar code reader during the feed of the original and decoded, and an image of the document sheet is read by a CCD, and the decoded bar code is stored in a magneto-optical disk as index information. When a reading error of the bar code occurs, the image of the bar code included in the reading image of the original is displayed on a display unit. An operator watches the displayed image of the bar code and inputs code information corresponding to the bar code from a keyboard.

22 Claims, 16 Drawing Sheets

FIG.6

| KEY WORD | CLUSTER NUMBER |
|---|---|
| 12309827 | 3F385 |
| 12309832 | 2AE98 |
| 12309845 | 8B2C3 |
| 12309853 | 6DAC3 |
| 12309862 | 908FE |
| 12309871 | 334DE |
| | |

FIG.7

| KEY WORD | CLUSTER NUMBER |
|---|---|
| 12309827 | 3F385 |
| 12309832 | 2AE98 |
| -1 | 8B2C3 |
| 12309853 | 6DAC3 |
| 12309862 | 908FE |
| -1 | 334DE |
| | |

FIG. 10

A SALES SLIP

PURCHASE DATE  93,07,29
SHOP NAME  SHINJUKU
GOODS NAME  A DINNER SET
NAME  SUZUKI ICHIRO

SLIP NUMBER  1 2 3 0 9 8 4 5
PURCHASE AMOUNT  ¥158,250—

1 2 3 0 9 8 4 5

IMAGE PROCESSING APPARATUS FOR PROCESSING CODE INFORMATION READABLE BY MACHINE

BACKGROUND OF THE INVENTION

1. Field of the Invention

The present invention relates to an image processing apparatus for processing code information readable by machine such as a bar code.

2. Related Background Art

An electronic file apparatus for storing image information derived by exposing and scanning a document sheet (original) image on a record medium such as a magneto-optical disk and retrieving the stored image has been known in the art.

FIG. 9 shows a perspective view of an external view of such an electronic file apparatus.

A document sheet (original) 1 is, for example, a slip sheet having an machine readable image such as a bar code as shown in FIG. 10.

The document sheet 1 is mounted on a document sheet table 2 and the feed of the document sheet is started by a command to start a record operation by a keyboard 7 or a function key 34. A bar code reader 300 reads a bar code 301 on the fed document sheet, decodes it and a decoded result, that is, a slip sheet number "12309845" in the example of FIG. 10, is stored in a magneto-optical disk together with an image as retrieval information of the document sheet. Thus, by subsequently entering the slip sheet number by the keyboard 7, it may be displayed on a display unit 5.

In the prior art apparatus, however, when a read error of the bar code occurs during the store operation of the document sheet, a CPU to be described above detects an error signal generated by the bar code reader 300 to stop the feed of the document sheet. As a result, an efficiency of storing work is lowered.

Further, in such a case, since an operator reads the slip sheet number printed on the document sheet and manually enters the slip sheet number from the keyboard 7, misentry of the number may occur.

SUMMARY OF THE INVENTION

It is an object of the present invention to provide image processing apparatus and image processing method which eliminate the above defects.

It is another object of the present invention to provide image processing apparatus and image processing method which can efficiently register a document sheet image on a record medium.

It is other object of the present invention to provide image processing apparatus and image processing method which can efficiently conduct a recovery process when a read error of machine readable code information occurs.

Other objects of the present invention will be apparent from the following description and the accompanying drawings.

BRIEF DESCRIPTION OF THE DRAWINGS

FIG. 6 shows an example of a retrieval record in the first embodiment, FIG. 7 shows an example of retrieval record in a second embodiment of the present invention, FIG. 10 shows an example of a document sheet with a bar code.

DETAILED DESCRIPTION OF THE PREFERRED EMBODIMENTS

The preferred embodiments of the present invention are now explained with reference to the drawings.

Figure 1:
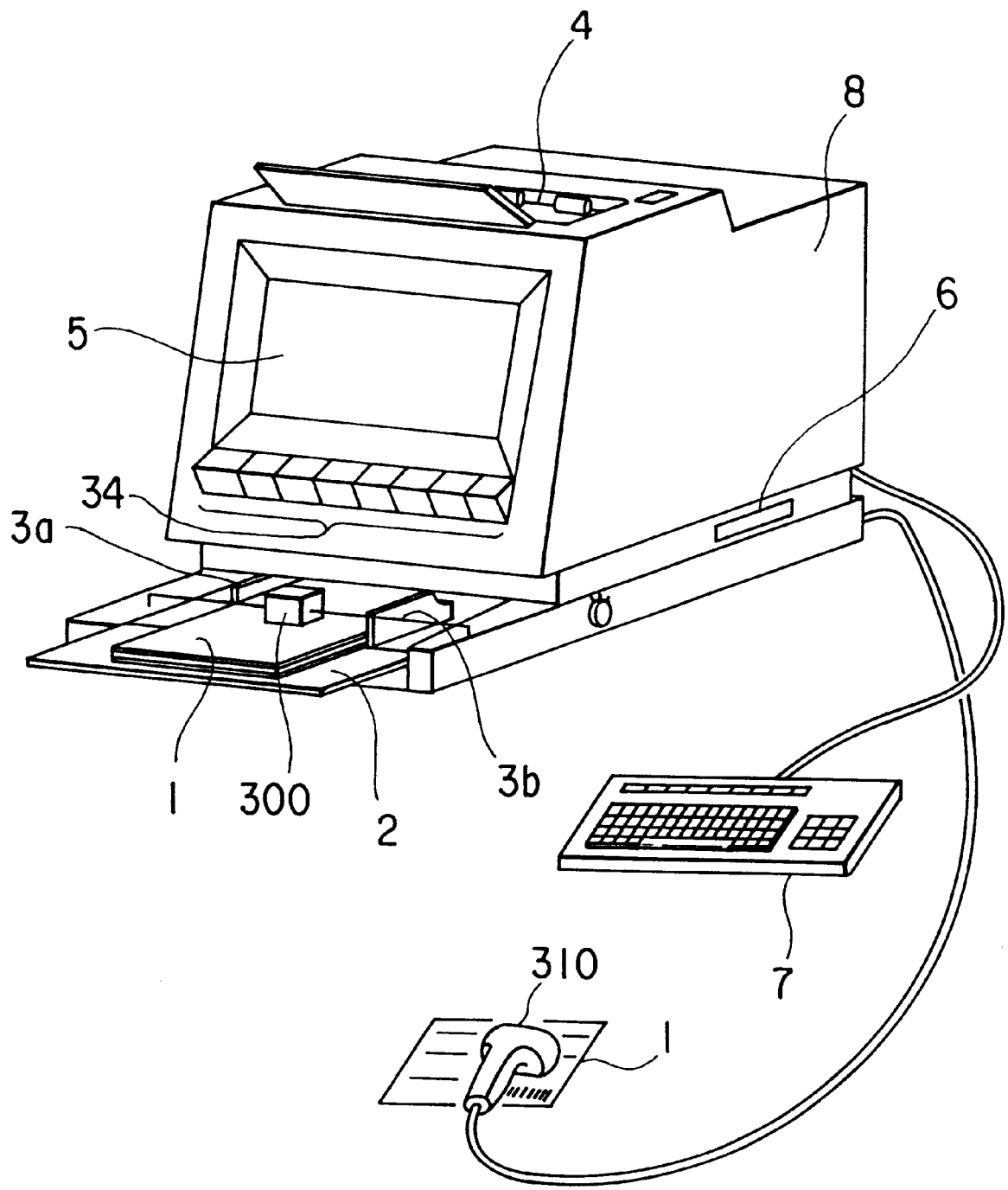
FIG. 1 shows a perspective view of an external view of an electronic file apparatus in accordance with a first embodiment of the present invention.
Figure 2:
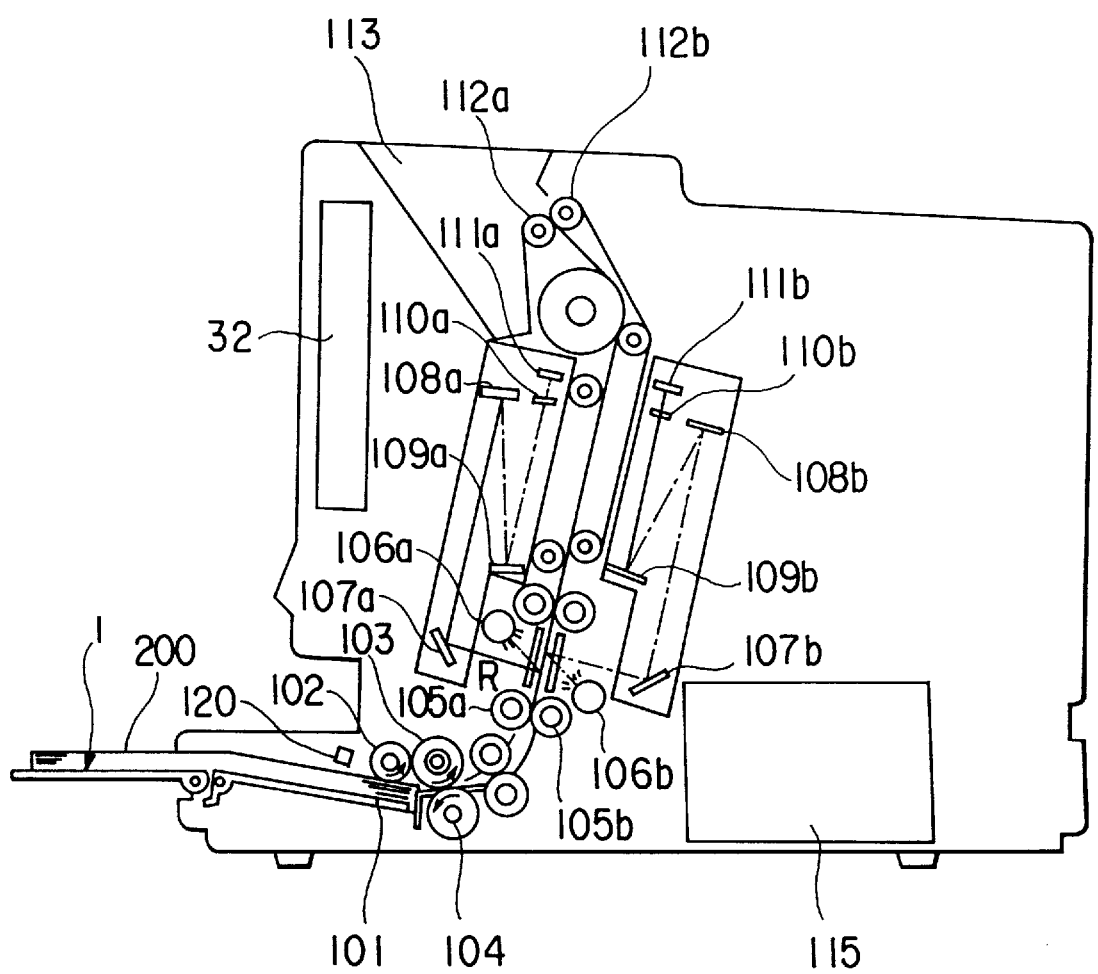
FIG. 2 shows a sectional view of an internal structure of the electronic file apparatus of the first embodiment.
Figure 3:
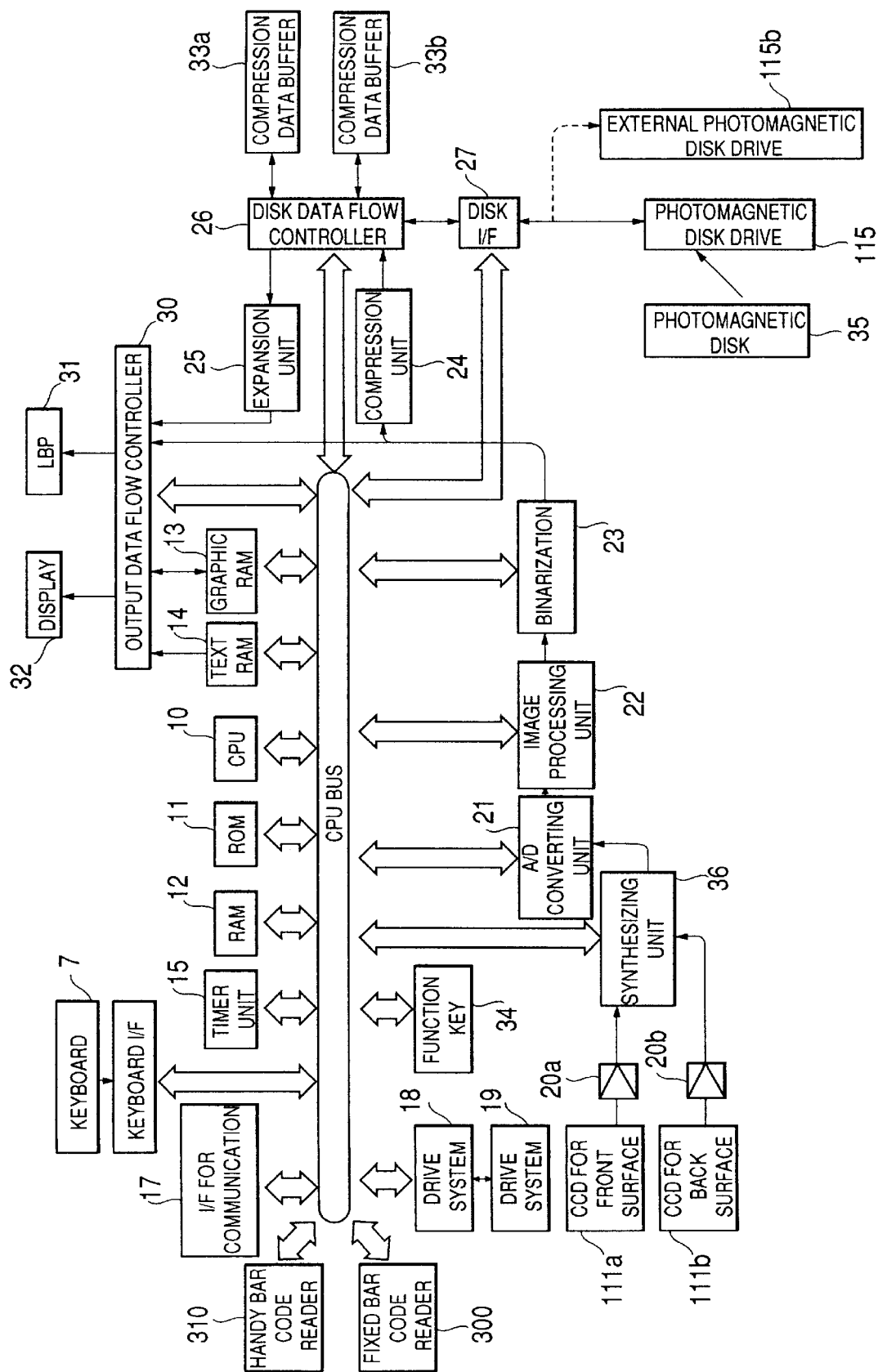
FIG. 3 shows a block diagram of a circuit configuration of the electronic file apparatus of the first embodiment.

FIG. 1 shows a perspective view of an external view of an electronic file apparatus in accordance with a first embodiment of the present invention and FIG. 2 shows a sectional view of an internal structure of the electronic file apparatus. FIG. 3 shows a block diagram of a circuit configuration of the electronic file apparatus.

In the present embodiment, a document sheet (original) 1 is assumed to be a slip sheet bearing a bar code 301 as shown in FIG. 10. In FIG. 1, a document sheet table (original table) 2 is provided in front of an apparatus body 8 and regulation plates 3a and 3b for regulating the feed of the document sheet 1 are provided on the document sheet table 2. A sheet eject unit 4 is provided on the apparatus body 8 and a display unit 5 for displaying image information and an operation command is provided on a front side of the apparatus body 8.

Further, a slot 6 through which a magneto-optical disk (photomagnetic disk) is inserted is provided on a side of the apparatus body 8. A keyboard 7 which is input means for entering a key word in the image retrieval is connected to the apparatus body 8 through a cable, and a handy bar code reader 310 is connected through a cable. A bar code reader 300 for reading a bar code added to the document sheet being fed is provided on the document sheet table 2.

Figure 11:
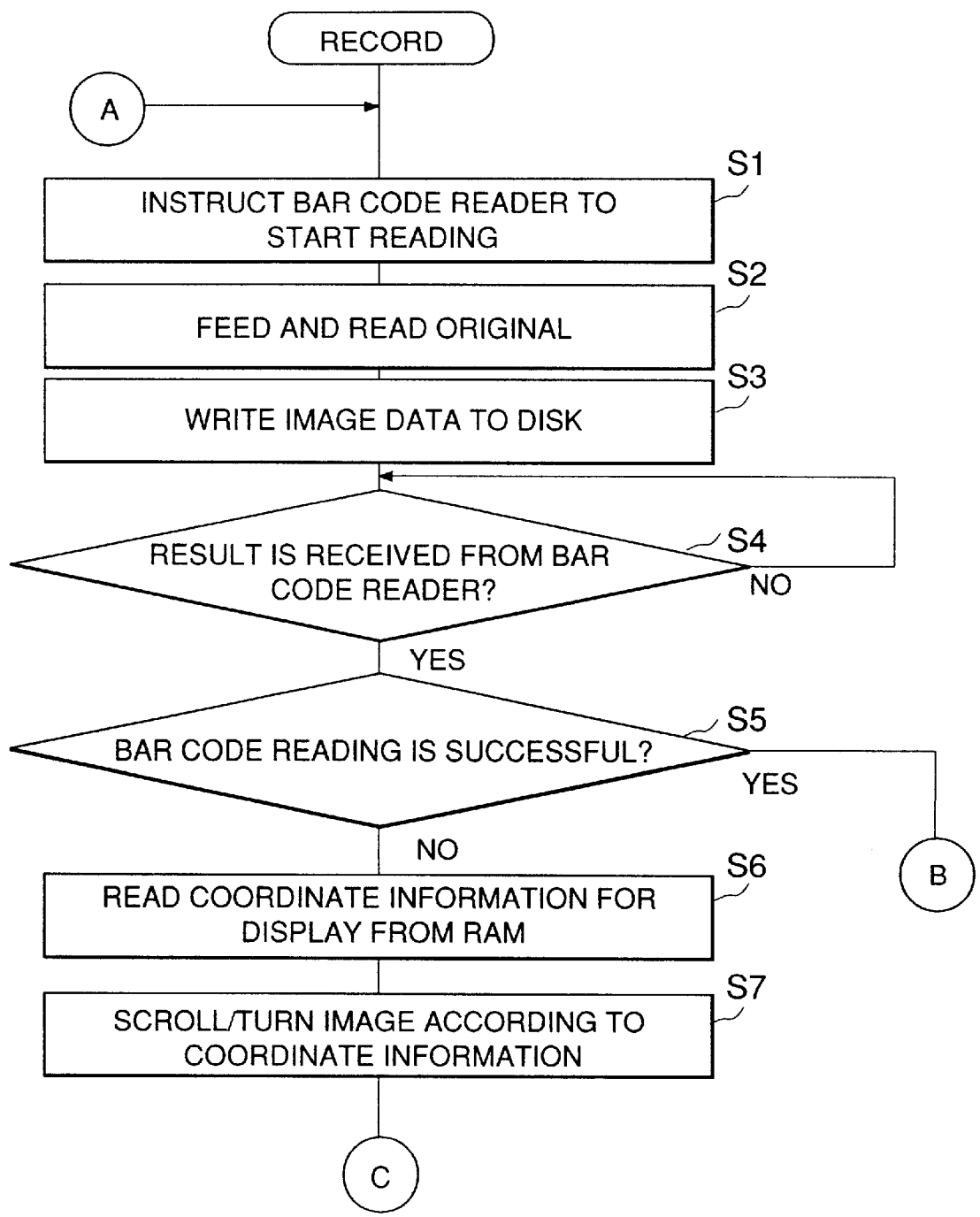
FIG. 11 shows a flow chart of an operation of the first embodiment.
Figure 12:
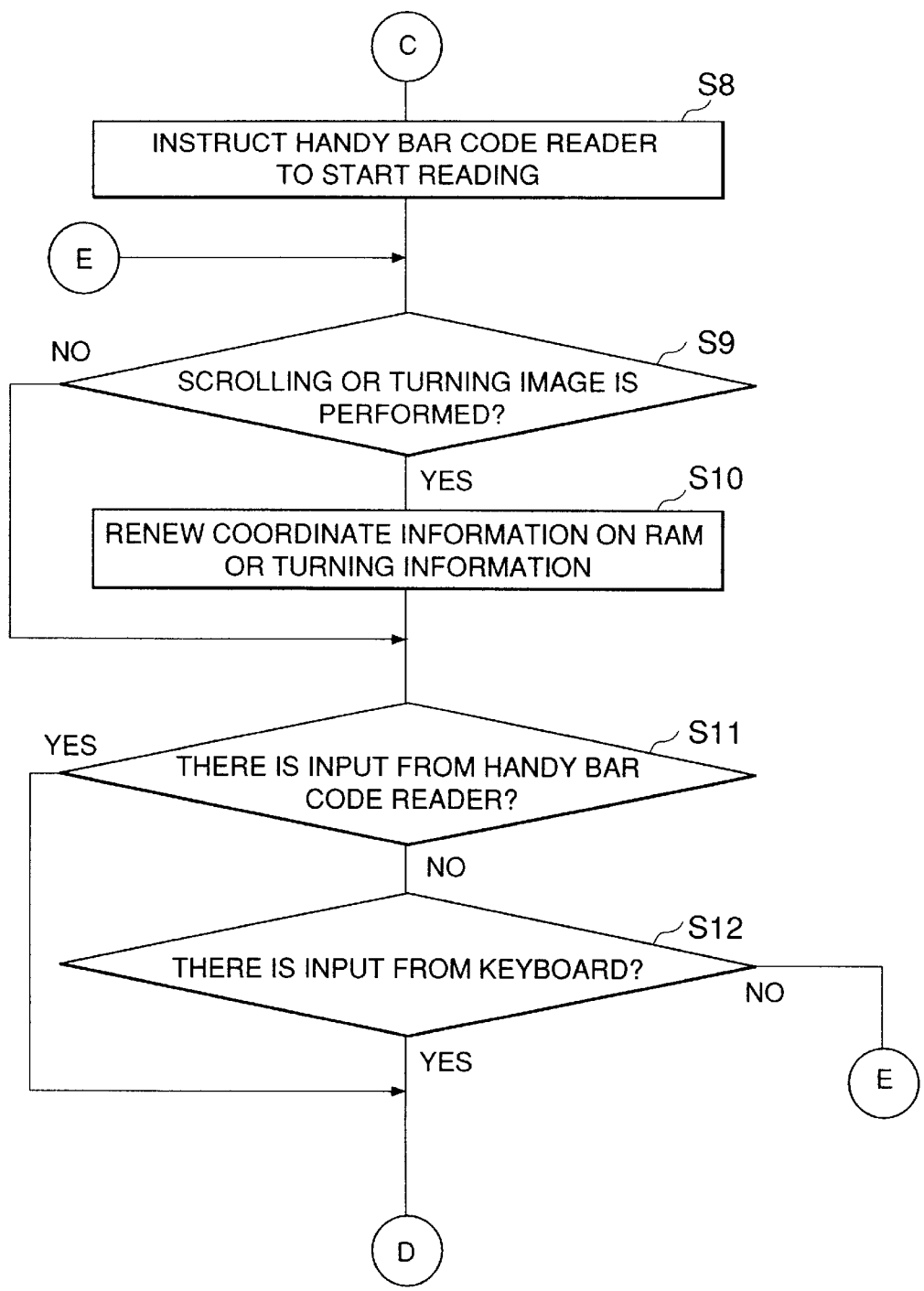
FIG. 12 shows a flow chart of an operation of the first embodiment.
Figure 13:
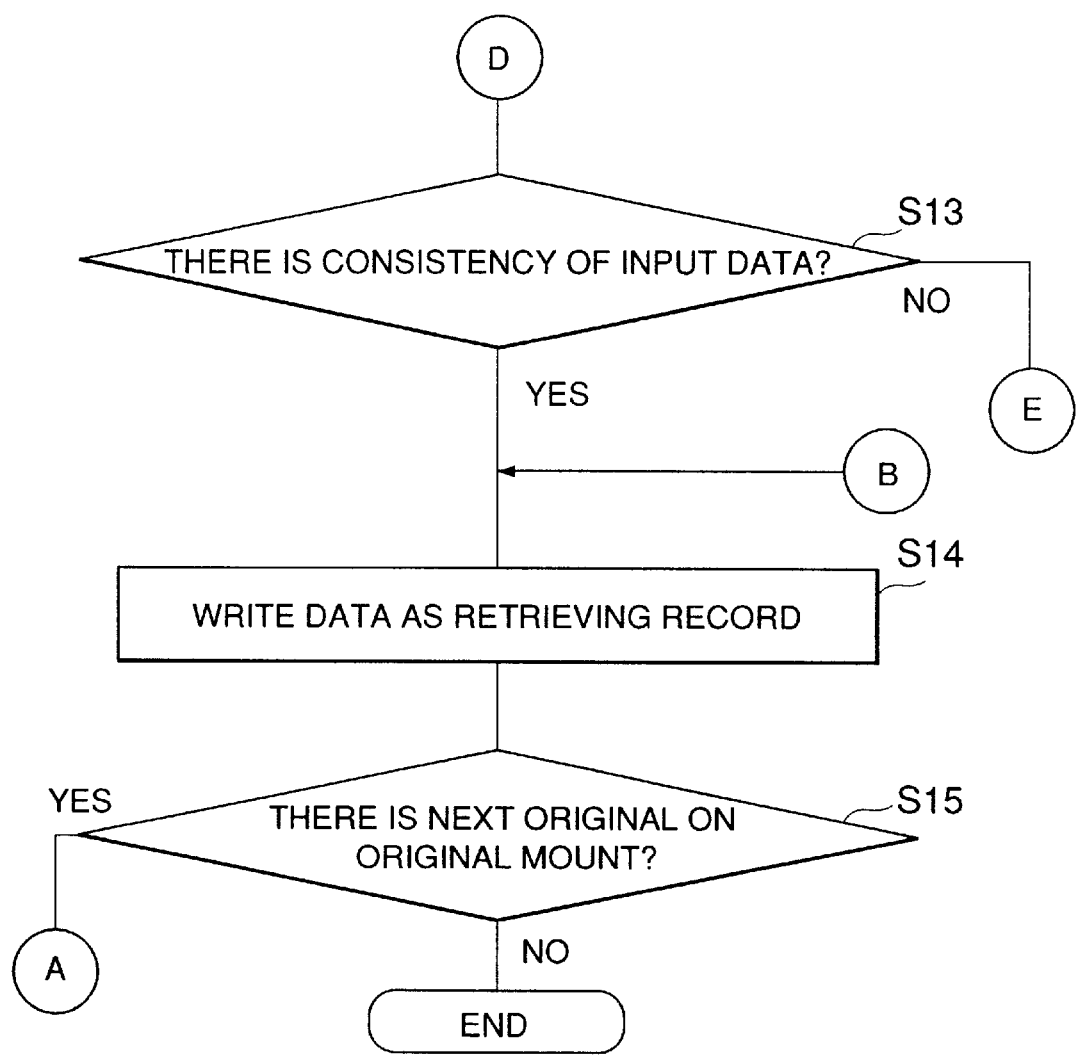
FIG. 13 shows a flow chart of an operation of the first embodiment.

FIGS. 11 to 13 show flow charts of a program in a ROM 11 which is executed in the present embodiment when the storing of the document sheet image is conducted. These are explained in conjunction with FIGS. 2 and 3.

When the document sheet information is to be stored, the document sheet 1 is mounted on the document sheet table 2 and a store operation command is issued through the keyboard 7 to start the feed of the document sheet (S2).

First, in FIG. 2, a feed roller 102 is rotated in the direction of arrow to feed the document sheet to a separation unit. The separation unit comprises a sheet feed roller 103 and a separation roller 104 which are rotated counterclockwise. A topmost document sheet is fed and other document sheets are left by a gap between the sheet feed roller 103 and the separation roller 104 and a friction with the separation roller.

A CPU 10 (FIG. 3) issues a read scan start command of the bar code to the bar code reader 300 which is the retrieval information read means upon the start of the feed of the document sheet 1 (S1). The bar code reader 300 comprises a light emitting device such as an LED and a photo-electric conversion device such as a CCD. When the bar code 301 of the document sheet 1 comes directly beneath the bar code reader 300, the bar code reader 300 sends a decode result of the bar code to the CPU 10.

The first fed document sheet 1 is fed by the feed roller 105 and reaches the read unit where image information of the document sheet illuminated by an illumination lamp 106 passes through mirrors 107 to 109 and reduced by a lens 110 and read by a CCD 111 which is read means. In the present embodiment, both sides of the document sheet may be read simultaneously.

After the reading, the document sheet 1 is stacked on the ejected sheet tray 113 by the sheet ejection roller 112.

The above steps are conducted continuously until the absence of the document sheet on the document sheet table 101 is detected by a document sheet sensor 120.

A drive unit 19 comprises the document sheet sensor 120 and a motor, not shown, and the feed is conducted by the CPU 10 which controls the drive unit 19 through a drive unit interface 18.

Image signals derived by a front side CCD 111a and a rear side CCD 111b are supplied to a combination unit (synthesizing unit) 36 through amplifiers 20a and 20b.

When the combination unit 36 transfer one main scan line of data from the front side CCD 111a to a succeeding stage, it switches an internal switching device to transfer one main scan line of image data from the rear side CCD 111b to the succeeding stage.

In this manner, the image data of the front side and the rear side are serialized by the main scan line and sent to the succeeding stage compression unit.

While the above description relates to the dual side reading, when the CPU 10 commands the single side reading to the combination unit 36, the switching operation described above is not conducted and only the image data from the front side CCD 111a is always sent to the succeeding stage.

The image signal from the combination unit 36 is quantumized by an A/D converter 21 and image processing such as edge enhancement is conducted by an image processing unit 22, and it is converted to 1 or 0 data by a binarization circuit 22.

The binary image data is on one hand stored in a graphic RAM 13 and on the other hand compressed such as MH, MR or MMR by a compression unit 24 and store in one of compressed data buffers 33a and 33b.

The graphic RAM 13 is constructed such that the data stored therein is drawn on the display unit 32 by an output data flow controller 30 and the binary data stored in the graphic RAM 13 is displayed on the display unit 32.

The compressed image data stored in the compressed data buffer 33a or 33b is sent to a magneto-optical disk drive 115 through a disk interface 27 and written in the magneto-optical disk (S3).

The two compressed data buffers 33a and 33b are provided in order to allow the scan of the next document sheet and store the compressed image data in the compressed data buffer 33b while the compressed image data of the compressed data buffer 33a is written in the magneto-optical disk.

In this manner, the restriction of waiting for the scan of the next document sheet until the writing of the image data of the previous document sheet to the magneto-optical disk is avoided and the storing speed of the document sheet is improved.

When the compressed data is written, the decode result from the bar code reader 300 (the number "12309845" of FIG. 10 in the present embodiment) is paired with the compressed image data and written in the magneto-optical disk to form an index for the subsequent retrieval (S14).

The above description relates to the normal decode operation of the bar code 301 by the bar code reader 300. The bar code 301 may not be correctly decoded due to the dirt on the document sheet.

In such a case, information on the failure of decoding is sent from the bar code reader 300 to the CPU 10 (S4, S5).

In response thereto, the CPU 10 temporarily stops the storing operation because the feed of the next document sheet mounted on the document sheet table 2 is not conducted. The CPU 10 also displays the failure of reading of the bar code on the display unit 32 and displays the image of the bar code area of the document sheet (S6, S7).

Under this condition, the CPU 10 commands the start of the read operation of the bar code to the handy bar code reader 310 which is the second retrieval information read means (S8).

The operator takes out the document sheet for which the reading of the bar code filed from the sheet ejection unit 4 and applies the handy bar code reader 310 to the bar code 301 of the document sheet to read the bar code of the document sheet (S11).

At this time point, the CPU 10 accepts the input from the keyboard 7. Instead of using the handy bar code reader 310, the slip sheet number (302 in FIG. 10) on the document sheet displayed on the display device 32 may be read and it may be entered from the keyboard 7 to enter the slip sheet number (S12).

Figure 4:
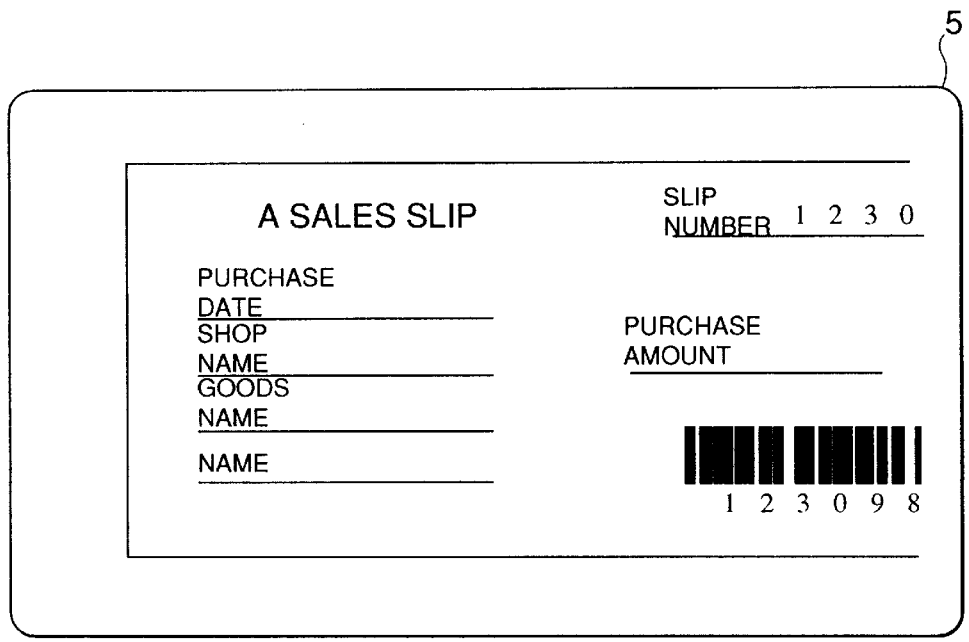
FIG. 4 shows an example of display of a display unit in the first embodiment.

FIG. 4 shows an example of display on the display unit 32 at this time point.

As shown, the image of the document sheet scanned by the CCDs 111a and 111b is displayed on the display unit 32 but the image necessary to enter the slip sheet number, that is, the area in which the slip sheet number 1230 . . . is printed may not displayed on the display unit 32 in its entity.

Figure 5:
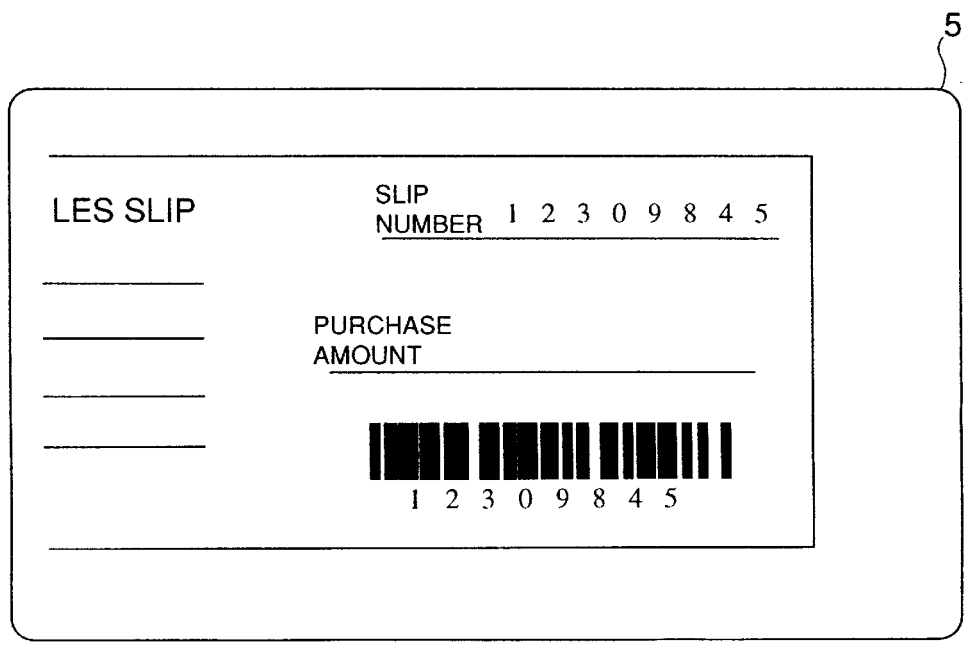
FIG. 5 shows an example of display of the display unit in the first embodiment.

In such a case, the image displayed on the display unit 5 is scrolled up and down or left and right by using the keyboard 7 or the function key 34 to set a display status at a display position as shown in FIG. 5. Alternatively, a command to rotate the image vertically or horizontally may be entered from the function key 34.

The scroll position is coordinate information of the area displayed on the display unit 32 in the image data stored in the graphic RAM 13. The rotation of the image may be conducted by rotating the image data on the graphic RAM 13.

The coordinate information or the image orientation information set by the keyboard 7 or the function key 34 is stored in the RAM 12.

When the read error of the bar code occurs in the subsequent storing operation of the document sheet, the display position is set in accordance with the display operation setting, that is, the coordinate information stored in the RAM 12 (S9, S10). Accordingly, once the image display position is set in the first read error of the bar code, the image is subsequently displayed such that the slip sheet number is displayed in the position readable by the operator as shown in FIG. 5 when the next read error of the bar code occurs, even if the display position of the image is moved by the retrieval operation.

The bar code has several predetermined formats which are disclosed in JIS B 9550 and JIS X 0502. According to the standards, the bar code usually contains an error detection code called a check digit. The check digit may be a residue by a predetermined number of a sum of digits and added to the last digit position, namely the position "5" of "12309845" in FIG. 10. The check digit may be generated in other various ways which are known in the art and hence not explained here.

When the slip sheet number is entered by the keyboard 7, the CPU 10 checks the matching of the check digit (S13). If the mismatching is detected by the checking of the check digit, it means the entry error from the keyboard 7 by the operator and it is displayed on the display unit 32 to prompt the check to the operator.

The misentry detection also includes the number of digits check. Namely, prior to the storing operation, the operator specifies the number of digits of the entry of the slip sheet number by the bar code through the keyboard 7 and the CPU 10 stores the specified number of digits in the RAM 12. In the bar code read error in storing the image, the number of digits of the slip sheet number manually entered by the keyboard 7 may not match to the number of digits stored in the RAM 12 and it is displayed on the display unit 32 to prompt the check to the operator.

The function of the check digit and the check of the number of digits are attained by the program in the ROM 11 connected to the CPU 10. Since the program is known in the art, it is not explained here.

In this manner, when the slip sheet number to be used as the index is entered from the keyboard 7 or the handy bar code reader 310, the CPU 10 detects it and resumes the subsequent storing operation of the next document sheet on the document sheet table 2 (S15).

Thus, a data table called a retrieval record is prepared for each image on the magneto-optical disk 35. FIG. 6 shows an example of the retrieval record. In FIG. 6, a previously entered index is stored in a key word column and a position on the magneto-optical disk of an image having the index added thereto is stored as a cluster number. The cluster number is a logical area indicating a storage location on the disk.

An operation to retrieve the stored image to display it is now explained.

In the retrieval, the operator first enters the slip sheet number from the keyboard 7. The CPU 10 collates the entered slip sheet number to the retrieval record of FIG. 6 to detect the cluster number of the target image. Then, the compressed image data corresponding to the cluster number is read from the magneto-optical disk 35 through the magneto-optical disk drive 115 by controlling the disk interface 27.

In this case, the disk data flow controller 26 is ready to send the compressed image data from the disk interface 27 to a decompression unit (EXPANSION UNIT) 25 under the control of the CPU 10.

At this time, the output data flow controller 30 stores the image data from the decompression unit 25 to the graphic RAM 13 and the CPU 10 commands to display the image data of the graphic RAM 13 on the display unit 32 as it is in storing the image. In this manner, the compressed image data on the magneto-optical disk is displayed.

A second embodiment of the present invention is now explained.

In the second embodiment, the continuous storing operation is not interrupted by the read error of the bar code in the image storing operation.

Figure 14:
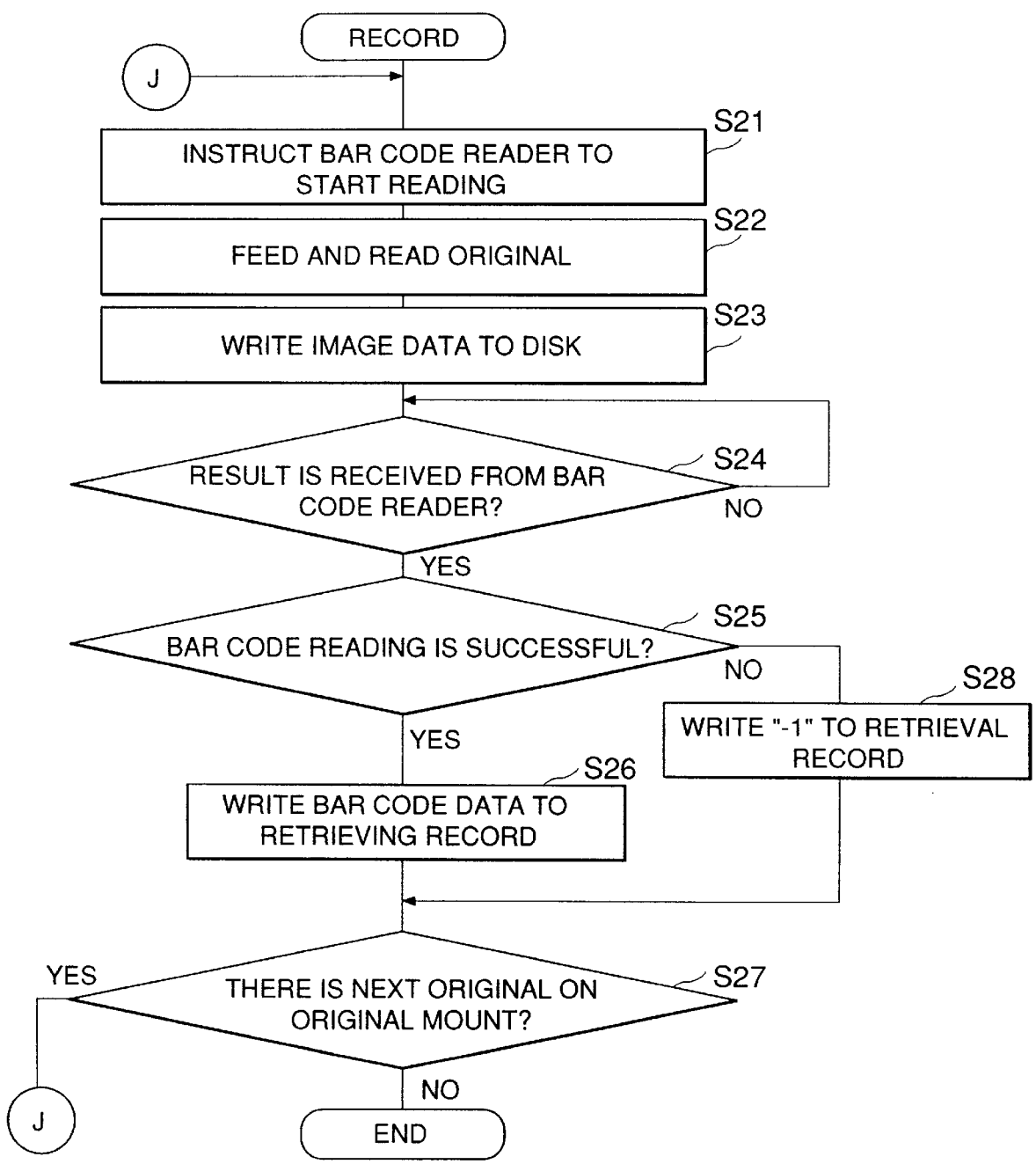
FIG. 14 shows a flow chart of an operation of the second embodiment.

FIG. 14 shows a flow chart of a program in the ROM 11 executed in the storing operation in the present embodiment.

In the present embodiment, the storing operation is conducted in the same manner as that of the first embodiment (S21 to S26), but when the information of the occurrence of the read error is received from the bar code reader 300 (S25), the CPU 10 adds retrieval information representing the occurrence of the read error, that is, "−1" as shown in FIG. 7 to the retrieval record as a key word and stores it in the magneto-optical disk together with the compressed image data (S28). The storing operation of the next document sheet is conducted (S27).

When the storing operation is completed, the operator conducts an operation called indexing in the present embodiment.

Figure 15:
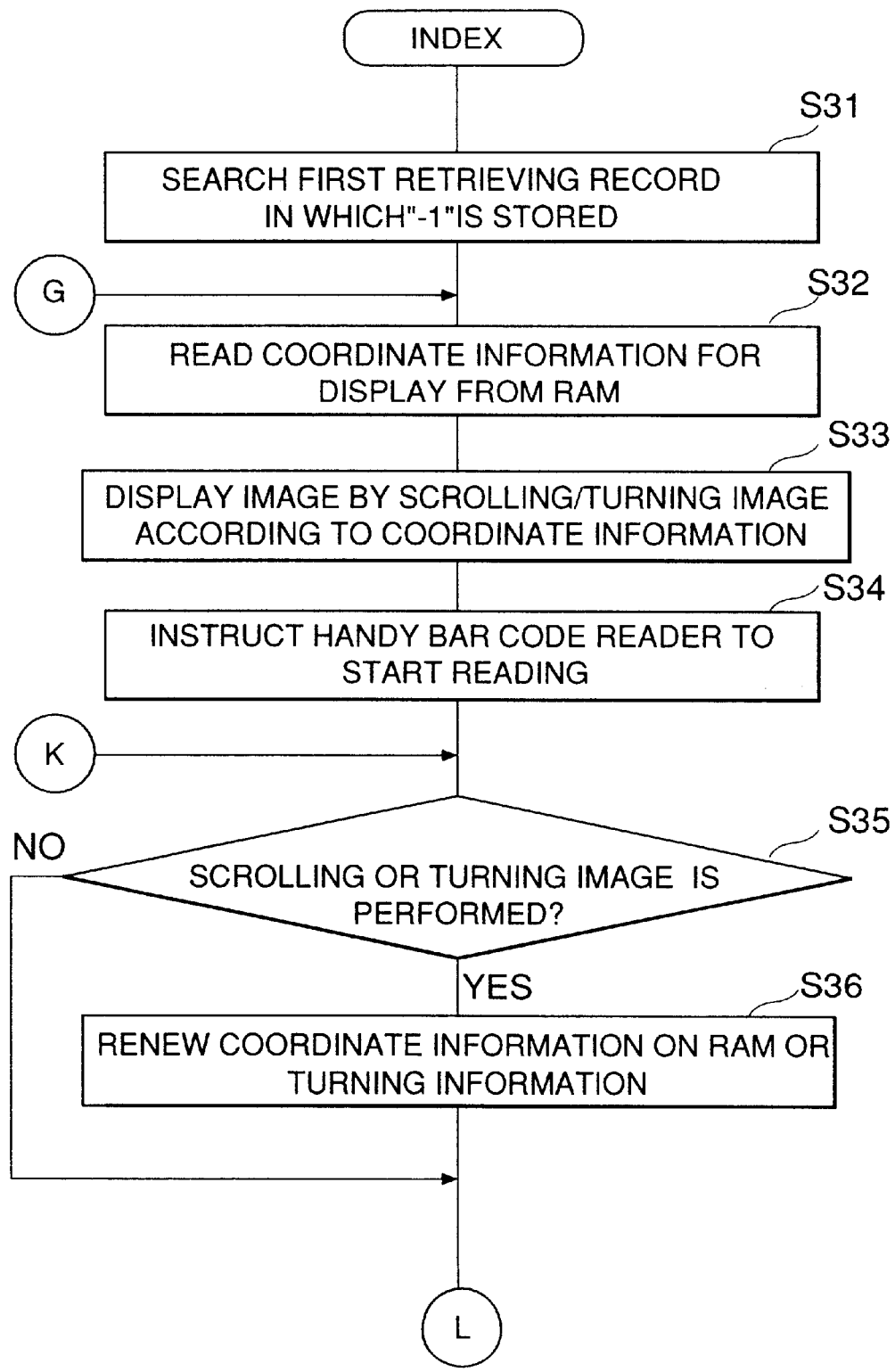
FIG. 15 shows a flow chart of an operation of the second embodiment.
Figure 16:
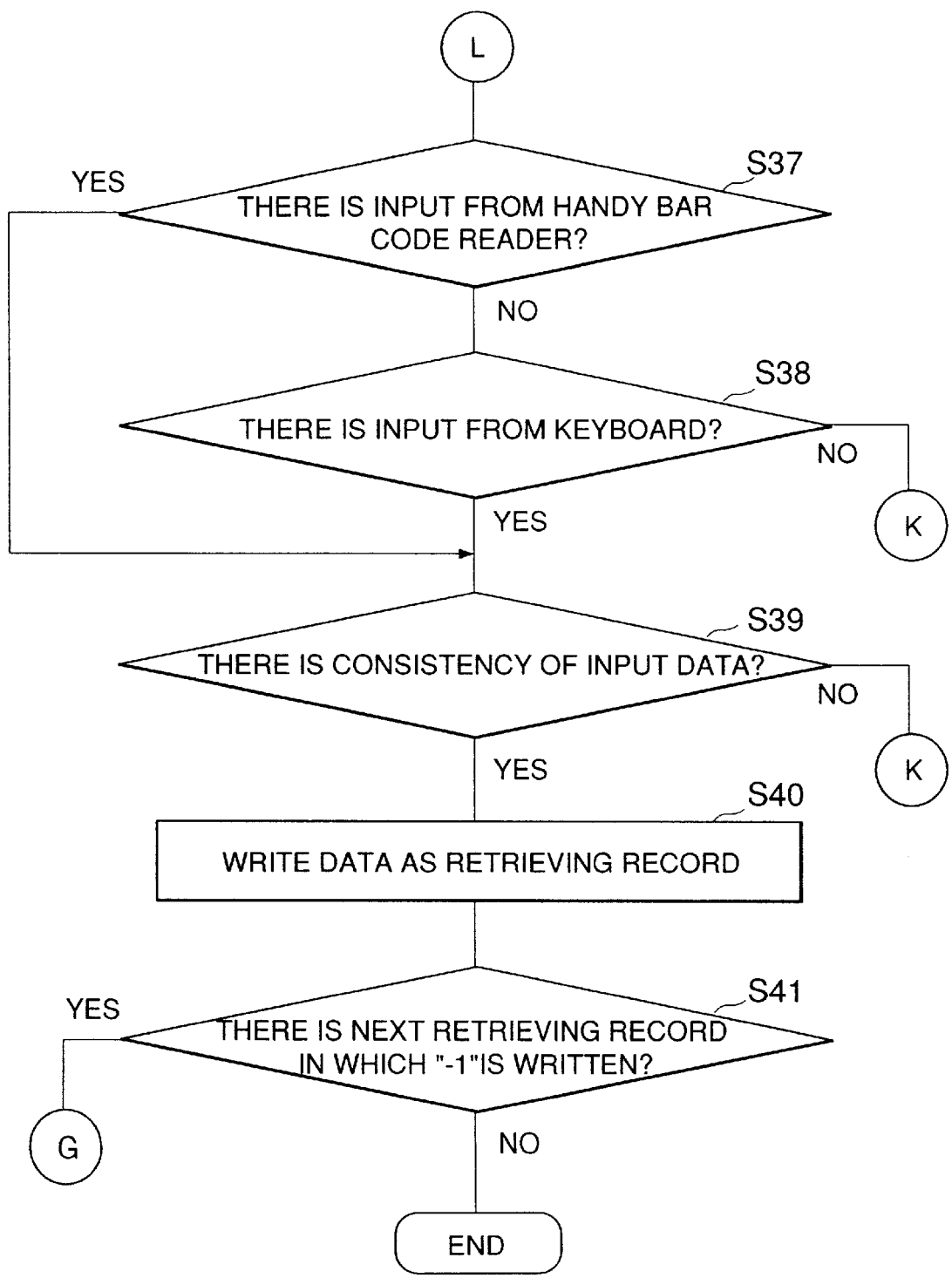
FIG. 16 shows a flow chart of an operation of the second embodiment.

FIGS. 15 and 16 show flow charts of the program in the ROM 11 which is executed in the indexing.

In the indexing, when the operator issues a command to conduct the indexing from the keyboard 7 to the CPU 10, the CPU 10 reads the retrieval record of FIG. 7 from the magneto-optical disk and displays the image of the first record bearing "−1" indicating the read error on the display unit 32 in the procedure described above (S31 to S33).

When the image for which the read error has occurred is displayed, the data of the display operation setting, if any, which was preset by using the keyboard 7 or the function key 34 may be read and the display position may be set in accordance with the coordinate position as it is in the first embodiment (S35, S36).

In addition to the display, the CPU 10 commands to start the read scan of the bar code to the handy bar code reader 310 and starts to accept the entry from the keyboard 7 (S34) as it does in the first embodiment.

Thus, the operator watches the display to apply the handy bar code reader 310 to the area of the bar code 301 on the display unit 32, or if the slip sheet for which the rear error occurred is available in site, apply the handy bar code reader 310 to the area of the bar code 301 on the slip sheet, or manually enter the slip sheet number from the keyboard 7 while watching the display to enter the slip sheet number (S37, S38).

In this case, the misentry check by the check digit or the misentry check by checking the match of the preset number of digits and the number of entered digits is conducted (S39) as it is in the first embodiment.

In this manner, when the slip sheet number is entered to the first document sheet for which the read error of the bar code has occurred, data is written by using it as the retrieval data (S40). The CPU 10 refers the retrieval record and shifts to the display of the image bearing "−1" as the key word (S41).

In this manner, the operator sequentially enters the slip sheet numbers of the document sheets for which the read errors have occurred.

A third embodiment of the present invention is now explained.

Figure 8:
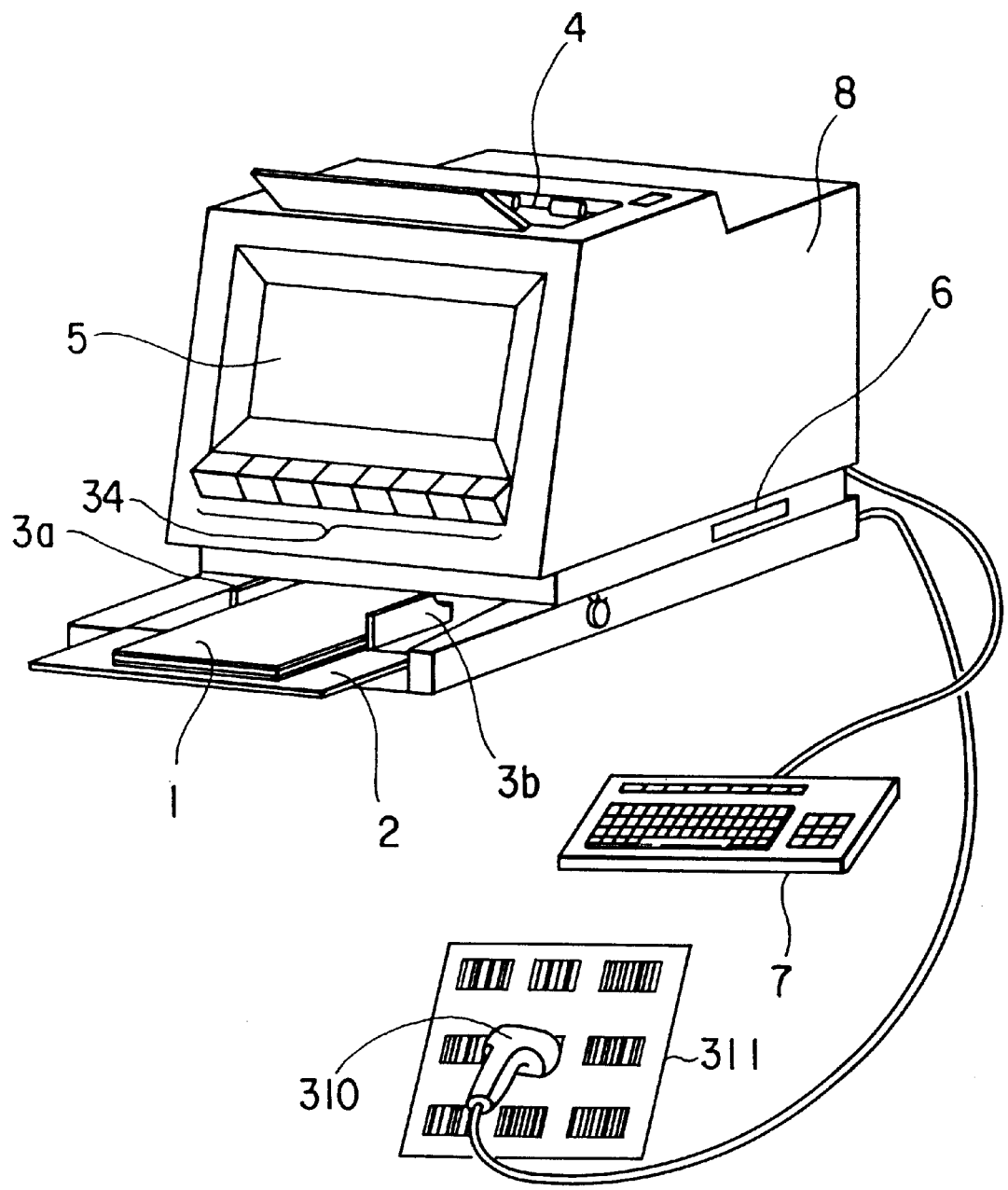
FIG. 8 shows a perspective view of an external view of an electronic file apparatus in accordance with a third embodiment of the present invention.
Figure 9:
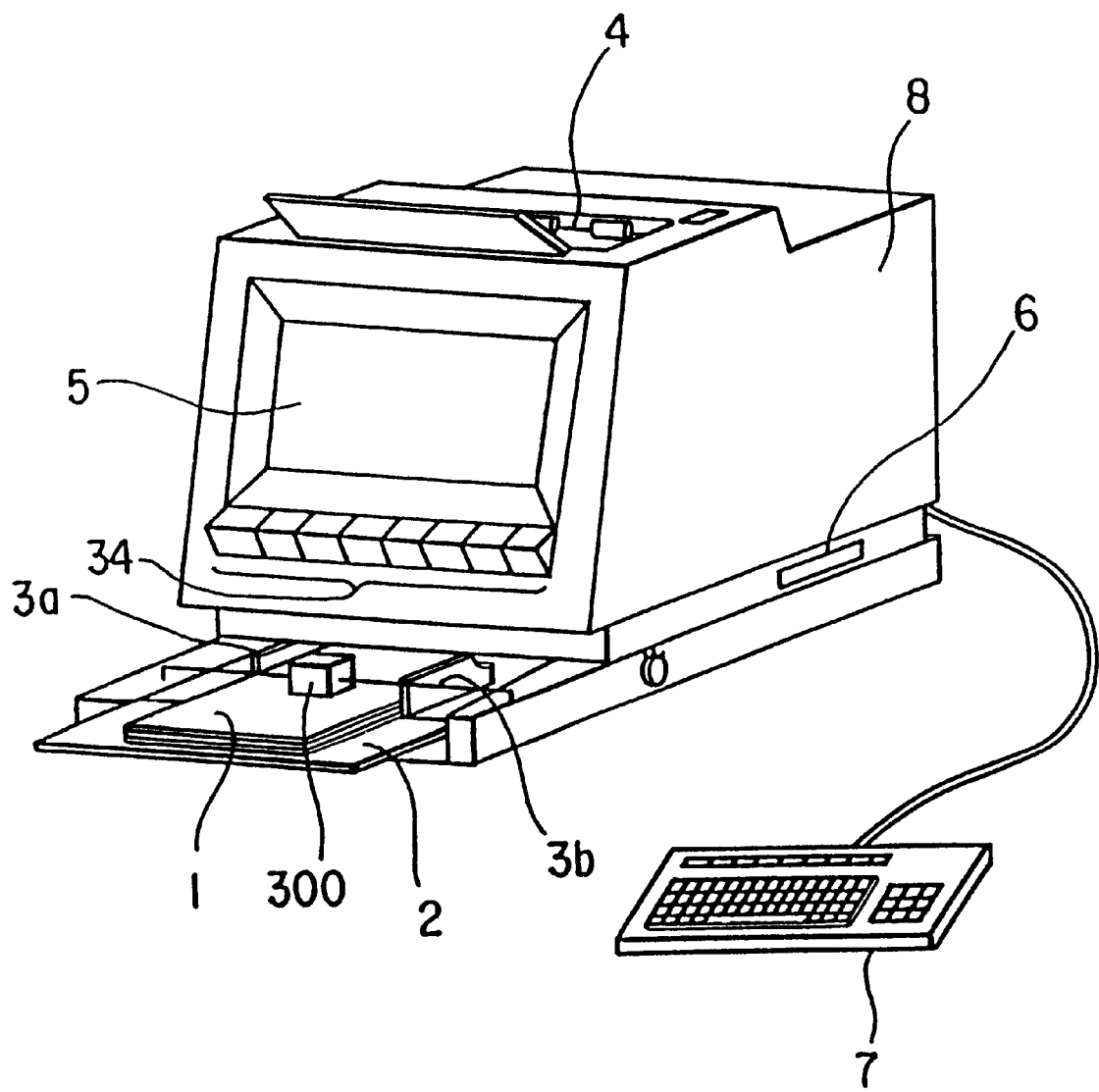
FIG. 9 shows a perspective view of an external view of a prior art electronic file apparatus.

As shown in FIG. 8, in an electronic file apparatus in accordance with the third embodiment, a bar code to be read as a key word is present in a medium other than the document sheet bearing the image.

Figure 17:
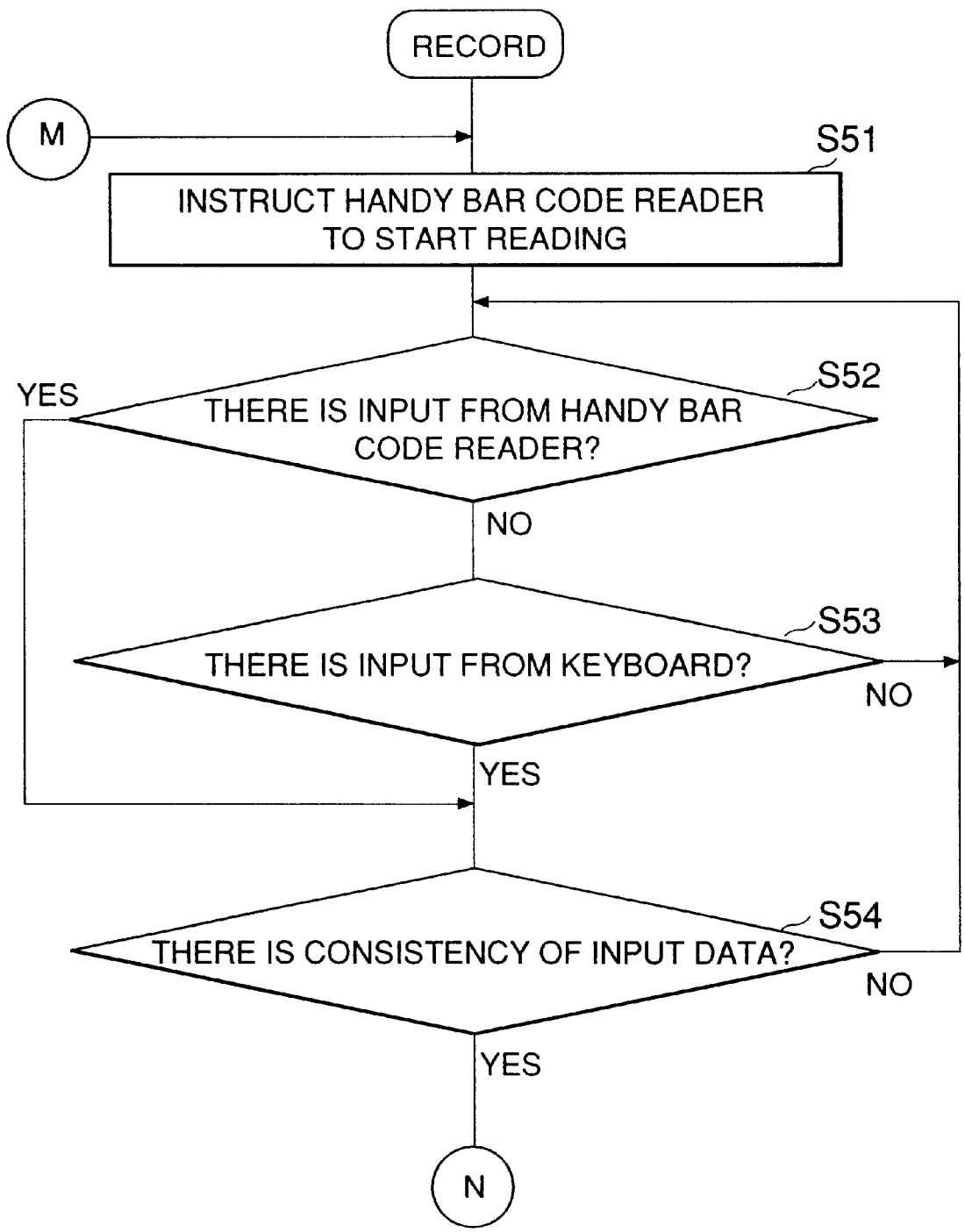
FIG. 17 shows a flow chart of an operation of the third embodiment.
Figure 18:
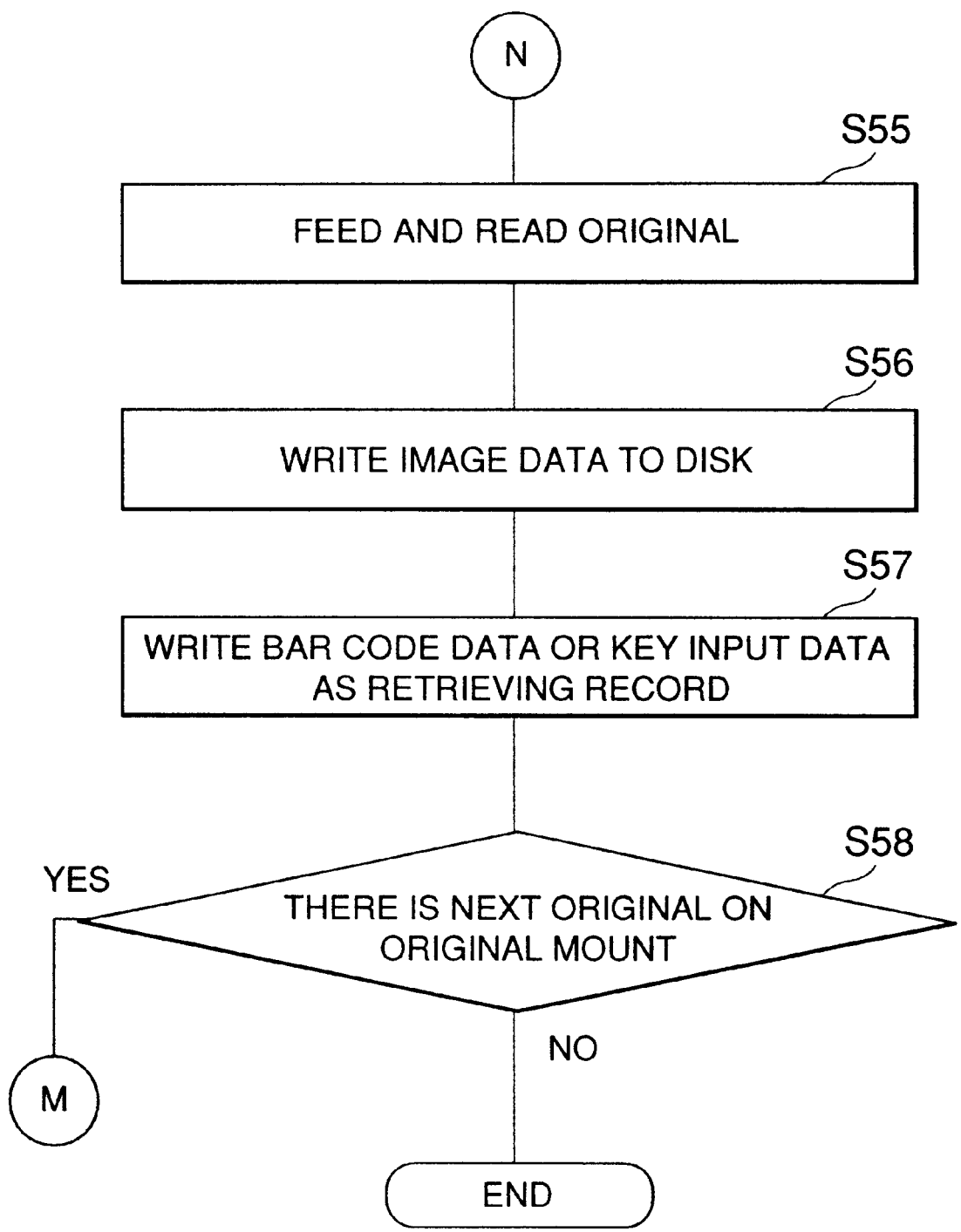
FIG. 18 shows a flow chart of an operation of the third embodiment.

FIGS. 17 and 18 show flow charts of a program in the ROM 11 which is executed in the storing operation in the present embodiment.

In storing the document sheet, the CPU 10 first commands to start the read scan of the bar code to the handy bar code reader 310 (S51).

When the handy bar code reader 310 receives the command to start the reading, it starts the scan. As shown in FIG. 8, the operator looks the document sheet 1 on the document sheet table 2 and selects the bar code related to the document sheet 1 from a medium other than the document sheet (which is referred to as a bar code sheet 311 in the present embodiment) and applies the handy bar code reader 310 to the bar code sheet 310 so that the handy bar code reader 310 reads it and transfers the read result to the CPU 10 (S52).

When the CPU 10 receives it, it starts to feed the document sheet 1 and stores the compressed image in the magneto-optical disk 35 together with the key word received from the handy bar code reader 310 (S55, S56) as it does in the previous embodiment.

The entry of the key word may be made not by the handy bar code reader 310 but by the manual entry from the keyboard 7 (S53). In this case, when the CPU 10 detects the entry of the key word, it starts to feed the document sheet 1 and the storing (S55, S56).

In this case, the misentry check by the check digit or the misentry check by matching the preset number of digits to the number of entered digits may be conducted (S54).

In this manner, the entered bar code data or the key entered data is written as the retrieval record (S57) and the process shifts to process the next document sheet (S58).

In the first embodiment or the second embodiment, when the image of the document sheet for which the read error has occurred is displayed, the position of the bar code in the document sheet may be detected and the area of the bar code may be displayed in accordance with the detected position.

Since the bar code reader 300 is arranged in accordance with the position of the bar code in the main scan direction, the position of the bar code in the document sheet may be detected by determining the timing at which the bar code is read and decoded while detecting the feed amount of the document sheet. Since the presence of an image which is likely to be a bar code can be read even if the bar code cannot be read, the position of the image which is likely to be the bar code may be used as the position of the bar code.

When the area of the bar code is displayed on the display unit 32, the area of the bar code may be displayed with an enlarged size so that the operator can readily watch the number added to the bar code.

When the position of the bar code is entered from the keyboard, the area of the bar code may be displayed based on the information on the position of the entered bar code.

When the bar code position is fixed and the bar code is always read at the predetermined position, the image of the predetermined position may be displayed as the bar code.

Instead of using the bar code reader 300, the image of the document sheet may be temporarily stored in the magneto-optical disk and then the image of the document sheet may be read and developed into a memory and the bar code may be read and decoded from the memory developed image.

It should be understood that the present invention is not limited to the above embodiments but various modifications thereof may be made within the scope of the claims.

What is claimed is:

1. An image processing apparatus comprising:

first reading means for reading images of originals including code information readable by a machine and character information readable by a person, corresponding to the code information;

second reading means for reading the code information on the originals read by said first reading means;

control means for causing a storage medium to store the image of the originals read by said first reading means by corresponding the code information read by said second reading means;

display means for displaying an area of a part of the image of a first original for which a reading error of the code information by said second reading means has occurred;

input means for inputting an instruction to move the area of the image to be displayed on said display means; and a memory for storing position information indicating a position of the area of the image moved by the instruction from said input means, wherein, when a reading error occurs for an second original that is read subsequent to the first original, said display means displays the area of the part of the image of the second original based on the position information stored in said memory without an input from said input means.

2. An image processing apparatus according to claim 1, wherein said display means displays the area of the code information based on an image signal outputted from said first reading means.

3. An image processing apparatus according to claim 1, further comprising input means for manually inputting the code information corresponding to the character information after the reading error occurred.

4. An image processing apparatus according to claim 1, wherein the code information is bar code information.

5. An apparatus according to claim 1, wherein said display means scrolls the area of the image to be displayed according to the instruction from said input means.

6. An apparatus according to claim 1, wherein said display means displays an area of the code information of the image of the original before the instruction from said input means is input.

7. An apparatus according to claim 6, further comprising:

detection means for detecting a position at which the code information read by said second read means is written, wherein said display means displays the code information on the basis of the position detected by said detection means.

8. An apparatus according to claim 6, wherein said display means displays the code information in an enlarged size.

9. An apparatus according to claim 7, wherein said detection means detects the written position of the code information based on a timing of the code information read by said second reading means.

10. An apparatus according to claim 7, wherein said detection means detects a predetermined position as the written position of the code information.

11. An image processing apparatus comprising:

a feeding device which feeds originals stacked on an original stack board, the originals including code information readable by a machine;

first reading means for reading an image of an original fed by said feeding device;

second reading means for reading the code information on the original read by said first reading means;

control means for causing a storage medium to store the image of the original read by said first reading means by corresponding the code information read by said second reading means, wherein said control means causes said feeding device to interrupt feeding a next original when the reading error of the code information by said second reading means has occurred; and third reading means for manually reading code information of the original for which a reading error of the code information by said second reading means has occurred, wherein said control means automatically restarts feeding, reading and storing of the remaining originals on the original stack board of said feeding device after the code information is read by said third reading means.

12. An apparatus according to claim 11, wherein said third reading means reads the code information of the original removed from said feeding device by an operator.

13. An apparatus according to claim 11, wherein said third reading means reads a predetermined sheet on which code information that is the same as the code information of the original set on said feeding device is written.

14. An apparatus according to claim 11, wherein said code information is bar code information.

15. An apparatus according to claim 14, wherein said third reading means is a hand-holdable bar code reader.

16. An image processing method comprising the steps of:

(a) reading an images of originals including code information readable by a machine and character information readable by a person, corresponding to the code information;

(b) reading the code information on the originals read in said step (a);

(c) causing a storage medium to store the image of the originals read in said step (a) by corresponding the code information read in said step (b);

(d) displaying an area of a part of the image of a first original for which a reading error of the code information in said step (b) has occurred;

(e) inputting an instruction to move the area of the image to be displayed in said step (d);

(f) storing position information indicating a position of the area of the image moved by the instruction in said step (e); and (g) when a reading error occurs for a second original that is read subsequent to the first original, displaying the area of the part of the image of the second original based on the position information stored in said step (f) is performed without executing said step (e).

17. A method according to claim 16, wherein the code information is bar code information.

18. A method according to claim 16, further comprising the step of inputting the character information corresponding to the code information after the reading error has occurred.

19. An image processing method comprising steps of:

(a) feeding originals stacked on an original stack board, the original including code information readable by a machine, wherein one original is read at a time;

(b) reading an image of the original fed in said step (a);

(c) reading the code information on the original read at said step (b);

(d) causing a storage medium to store the image of the original read at said step b) by corresponding the code information read at said step c);

(e) causing said step (a) to interrupt feeding next original when a reading error of the code information has occurred at said step (c);

(f) reading the code information of the original for which the reading error has occurred in said step (c), by an operator's manual operation different from the reading method at said step (c); and (g) automatically restarting feeding, reading and storing of the remaining originals on the original stack board in response to the reading of the code information in said step (f).

20. A method according to claim 19, wherein said step (f) includes reading the code information of the original removed by an operator.

21. A method according to claim 19, wherein said step (f) includes reading a sheet on which same code information of the original fed in step (a) is written.

22. A method according to claim 19, wherein the code information is bar code information.

* * * * *

UNITED STATES PATENT AND TRADEMARK OFFICE
CERTIFICATE OF CORRECTION

PATENT NO. : 5,930,409
DATED : July 27, 1999
INVENTOR(S) : KAZUO OHTANI

Page 1 of 2

It is certified that error appears in the above-identified patent and that said Letters Patent is hereby corrected as shown below:

ON THE TITLE PAGE

[57] Abstract:

Line 2, "a" (first occurrence) should read --an--.

COLUMN 2

Line 60, "input" should read --an input--.

COLUMN 3

Line 42, "transfer" should read --transfers--; and
    Line 64, "store" should read --stored--.

COLUMN 4

Line 55, "displayed" should read --be displayed--; and
          "entity." should read --entirety.--.

COLUMN 8

Line 29, "an" should read --a--.

COLUMN 9

Line 38, "an" should be deleted.

UNITED STATES PATENT AND TRADEMARK OFFICE
CERTIFICATE OF CORRECTION

PATENT NO. : 5,930,409
DATED : July 27, 1999
INVENTOR(S) : KAZUO OHTANI

It is certified that error appears in the above-identified patent and that said Letters Patent is hereby corrected as shown below:

COLUMN 10

Line 26, "step b)" should read --step (b)--; and
    Line 27, "step c)" should read --step (c)--.

Signed and Sealed this

Eighth Day of August, 2000

Attest:

Q. TODD DICKINSON

Attesting Officer

Director of Patents and Trademarks